United States Patent
Huber

[11] Patent Number: 5,816,758
[45] Date of Patent: Oct. 6, 1998

[54] CARGO LATCH

[75] Inventor: Thomas Huber, Iffeldorf, Germany

[73] Assignee: Telair International Cargo Systems GmbH, Hausham, Germany

[21] Appl. No.: 670,658

[22] Filed: Jun. 26, 1996

[30] Foreign Application Priority Data

Jul. 12, 1995 [DE] Germany .................. 195 25 392.2

[51] Int. Cl.⁶ ........................................... B60P 7/08
[52] U.S. Cl. .......................... 410/77; 410/69; 410/92; 403/2; 411/2
[58] Field of Search ................... 410/69, 77–80, 410/83, 92, 94, 104, 105; 244/137.1, 118.1; 248/500, 503, 503.1; 403/2; 411/2, 3, 4

[56] References Cited

U.S. PATENT DOCUMENTS

| | | | |
|---|---|---|---|
| 3,693,920 | 9/1972 | Trautman | 410/77 |
| 3,906,870 | 9/1975 | Alberti | 410/79 |
| 3,927,622 | 12/1975 | Voigt | 410/79 |
| 4,401,286 | 8/1983 | Naffa | 410/78 X |
| 5,558,455 | 9/1996 | Emery | 403/2 |
| 5,567,096 | 10/1996 | Howard | 410/37 X |
| 5,573,359 | 11/1996 | Moradians | 410/77 X |
| 5,618,139 | 4/1997 | Grab et al. | 410/69 |

FOREIGN PATENT DOCUMENTS

| | | |
|---|---|---|
| 0563562A1 | 2/1993 | European Pat. Off. . |
| 2161735 | 5/1974 | Germany . |
| 4224820C1 | 8/1993 | Germany . |
| 4216413A1 | 1/1994 | Germany . |
| 1144080 | 3/1969 | United Kingdom ........... 411/3 |

*Primary Examiner*—Stephen T. Gordon
*Attorney, Agent, or Firm*—Howard & Howard

[57] ABSTRACT

To secure containers on the floor of the cargo area of an aircraft, latches are known that comprise a frame and at least one latch hook, which is mounted on the frame so that it can pivot about an axle from a retracted resting position into an upright operating position. If due to inattentiveness of the service personnel the latch hook is left in its operating position and a container strikes against it while it is in this position, the result is often destruction of the floor structure. It is proposed to provide a safety device that allows the latch to be deflected out of the way when it is subjected to a predetermined overload in a direction parallel to the floor of the cargo area.

4 Claims, 4 Drawing Sheets

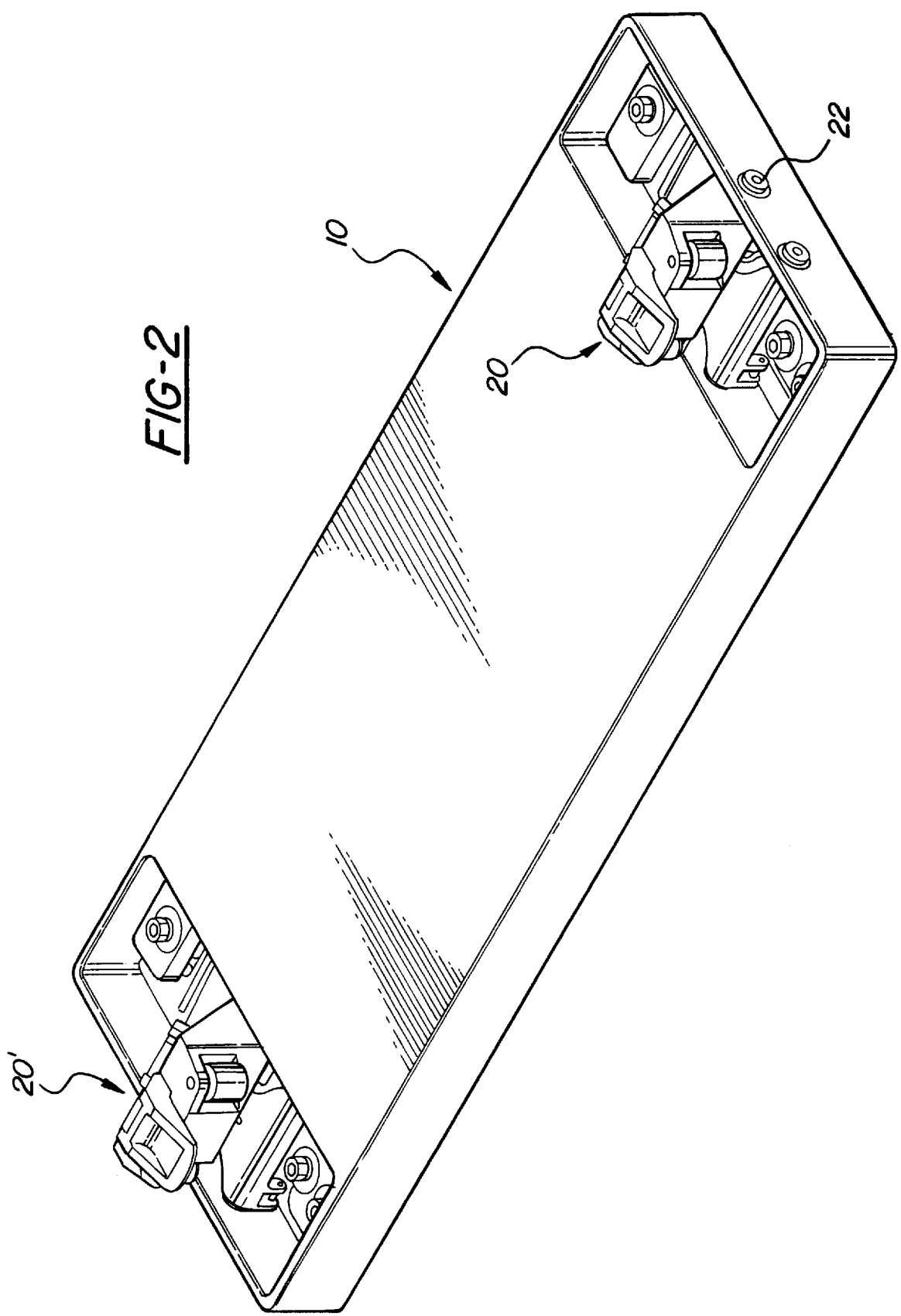

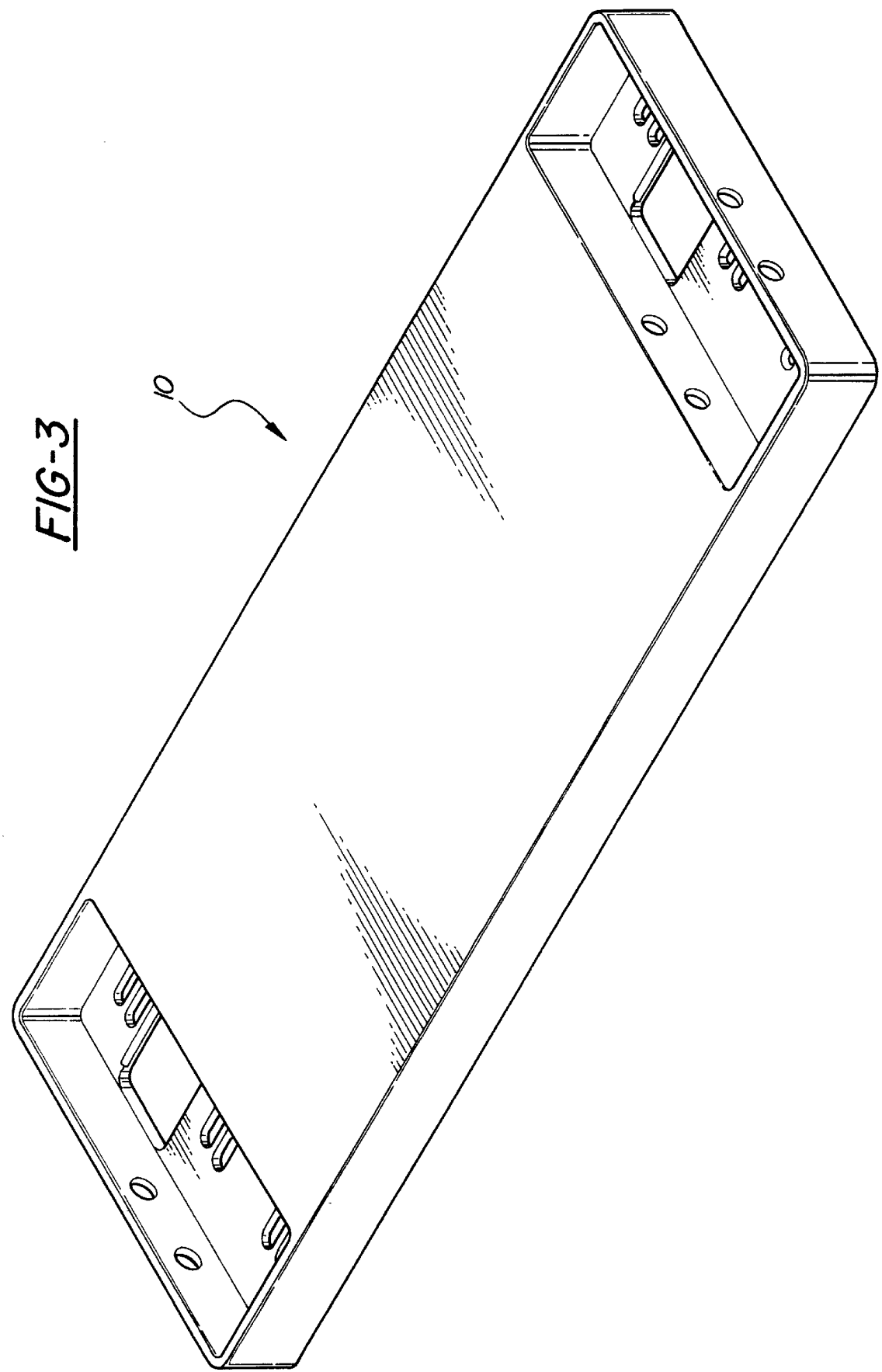

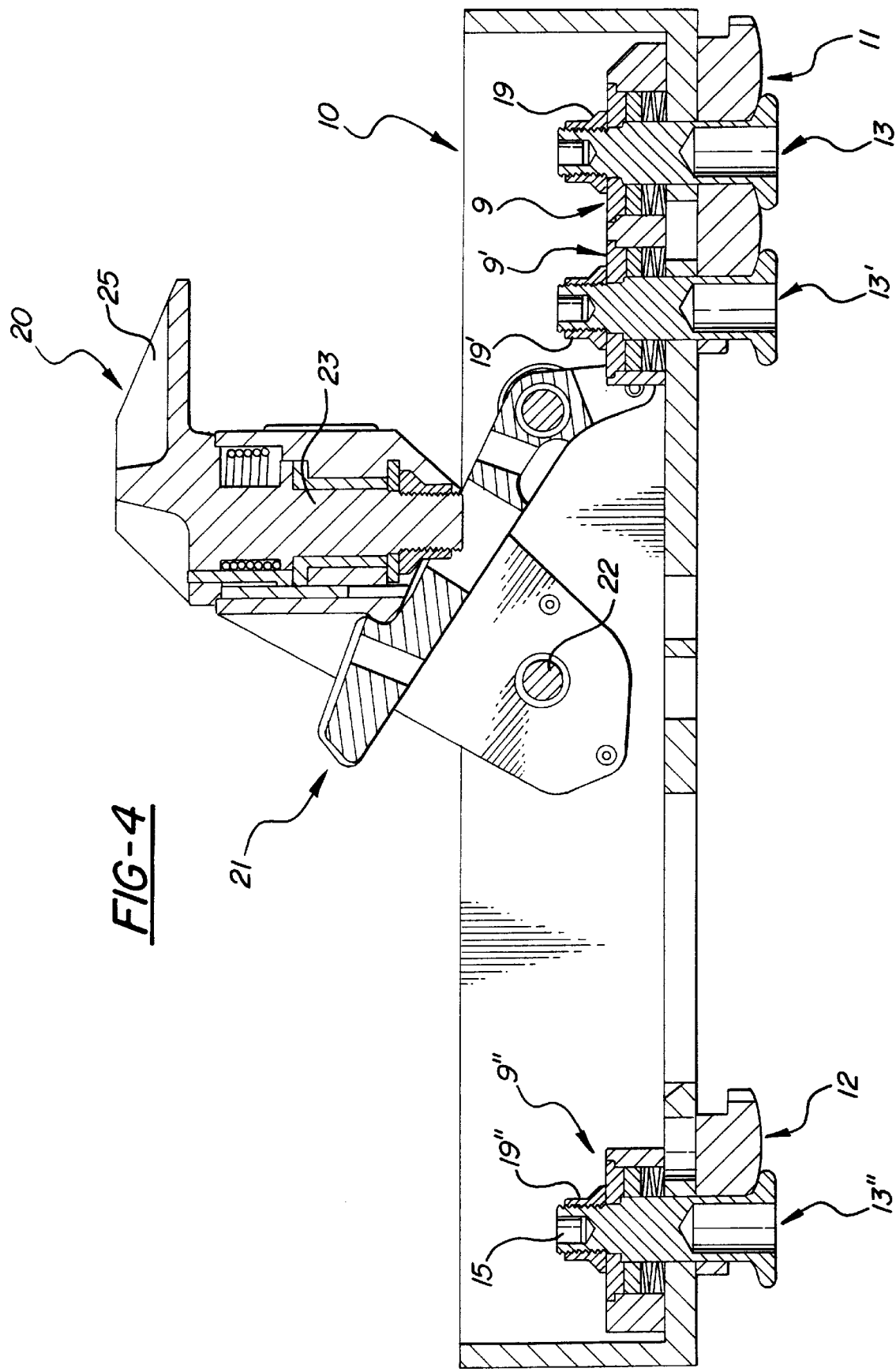

CARGO LATCH

FIELD OF THE INVENTION

The invention relates to a latch for securing loads such as a container to the floor of a cargo area in an aircraft.

DESCRIPTION OF THE PRIOR ART

Conventionally, containers are held on the floor of an aircraft cargo area by latches comprising hooks that can be retracted to allow the passage of successive containers through the cargo area, which is typically accessible from only one side.

In this situation, if the service personnel are incautious or work carelessly, as is not uncommon owing to the time pressure during loading and unloading, it can happen that the hook of a latch remains in the upright position while a container is being moved into the cargo area. Then the container strikes against the upright hook in a direction perpendicular to the plane of rotation of the hook. As a result the latch element and, which is much worse, the floor structure of the aircraft can be damaged, with the consequence of prolonged grounding and enormous repair costs.

German patent DE 42 24 820 C1 discloses a latch of the kind cited above, which because of the structure of its frame possesses certain elasticity properties to absorb bumps and other impacts. However, to be absorbable by this latch, the impacts must act substantially only within the plane of rotation of the hook, so that the problem at issue here cannot be solved by this latch.

It is an object of the invention to provide a latch that can substantially withstand the impact of a container moving perpendicular to the plane of rotation of the hook and that also prevents damage occurring to the floor structure.

SUMMARY OF THE INVENTION

According to the present invention there is provided a latch for securing a container on the floor of a cargo area of an aircraft comprising a frame; at least one latch hook, which is mounted on the frame so that it can rotate about an axle from a retracted resting position into an upright operating position; an attachment means for attaching the frame within rails in the floor of the cargo area; and a safety device that allows the latch to be deflected out of the way when subjected to a predetermined overload in a direction parallel to the floor of the cargo area.

Thus, the load-bearing ability of the latch is intentionally limited at least in a particular direction, this limiting load being less than the load that would cause permanent damage to the latch element and in particular the floor structure.

The safety device can, for example, be disposed in the frame itself such that a latch hook overloaded by the impact of a container will rotate or be deflected out of the way. However, it is especially simple to dispose the safety device at or in the attachment mechanisms, which ensures that diverse latches can be attached at the floor of the cargo area by one and the same attachment mechanism with safety devices.

Preferably the safety device is so constructed that the latch gives way only under a precisely specified overload. It is especially advantageous also to specify the direction in which the overload must act to cause the safety devices to operate. In particular, preferably the safety device is constructed so that a deflection of the latch is possible only in the case of a predetermined overload in a direction substantially parallel to the axle about which the latch hook pivots.

That is, the overload must be applied in a direction perpendicular to the plane of rotation of the latch hook in order to activate the safety device. This specification makes it possible for the safety device to be activated even when the applied load is considerably smaller than the load that the latch hook must sustain when holding a container. The reason is that this "normal load" acts substantially in directions perpendicular to the axis of rotation of the latch hook and hence perpendicular to the direction of action of the overload forces that are to be avoided.

It would be possible to construct the safety device in such a way that the latch tilts only partially away during overload. Preferably, however, the safety devices are so constructed that the latch is completely freed during overload. In an embodiment of the invention that is especially simple to manufacture, the safety device comprises predetermined breaking points in parts that can be exchanged easily and cheaply.

When the attachment means for the latches comprise attachment bolts, the safety device can also comprise breaking points, in particular notches and bores, that reduce the load-bearing capacity of the bolts.

BRIEF DESCRIPTION OF THE DRAWINGS

The present invention will now be described by way of example with reference to the accompanying drawings, wherein:

FIG. 2 is a perspective view of a double latch arrangement with a frame;

FIG. 3 is a perspective view of the frame shown in FIG. 2;

FIG. 4 is a sectional view of the latch shown in FIG. 2; and

DESCRIPTION OF THE PREFERRED EMBODIMENTS

Figure 1:
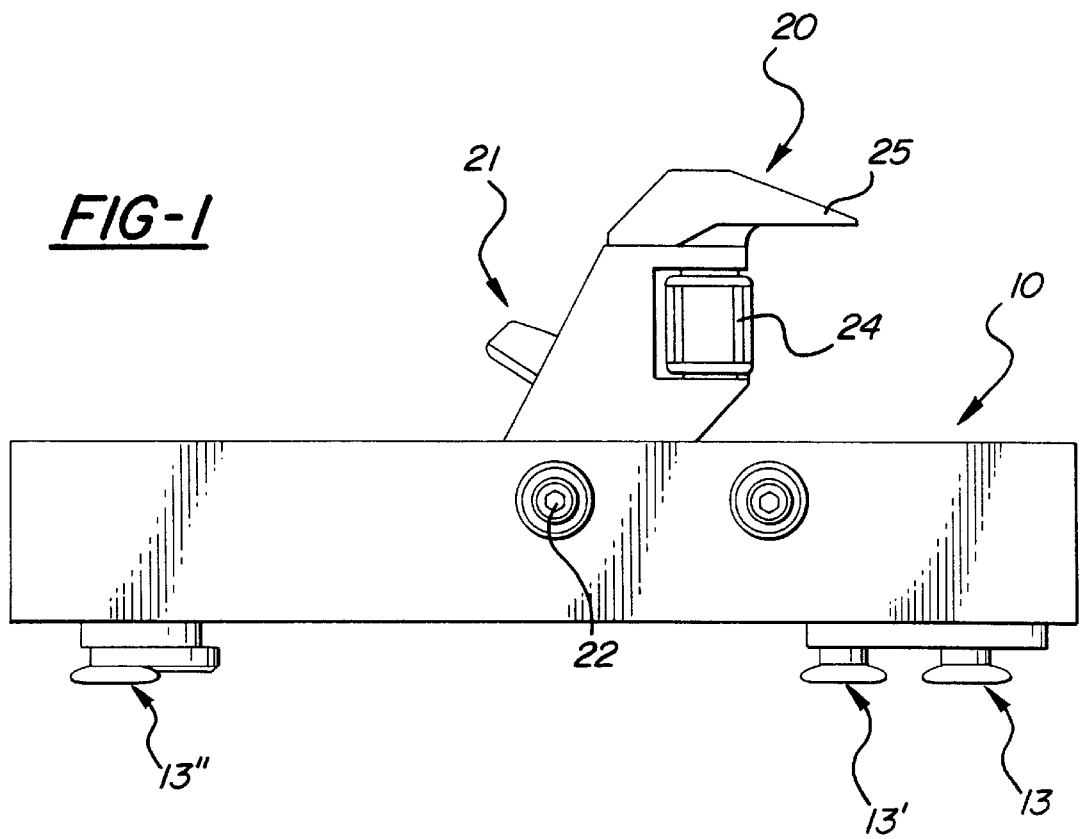
FIG. 1 is a side view of a latch shown with a latch hook thereof raised.

In the following description, identical reference numerals are used for similar parts or parts with a similar function.

FIG. 1 shows a latch in side view, so that the plane of the drawing corresponds to the plane in which a latch hook 20 can be pivoted about its axle 22, which is mounted in a frame 10. The frame 10 can be attached by way of three identical attachment bolts 13, 13', 13" to holding rails customarily disposed in the floor of a cargo area of an aircraft.

The locking hook 20 is provided with an upper hook cover 25 and a lower shaft 23. Hook 20 which can pivot in a horizontal plane about the shaft 23. This pivotability additionally protects the latch hook 20 from damage, when a container strikes against the outwardly projecting part of the hook cover 25 in a direction perpendicular to the plane of the drawing in FIG. 1, i.e. parallel to the axis of rotation 22 the hook cover 25 is deflected away as the shaft rotates about its vertical axis. To provide further protection from damage under load in the above-mentioned direction, a pair of guard rollers 24 (only one of which can be seen in FIG. 1) is provided on the locking hook 20.

The latch hook 20 is held by a detent such as stop lever 21, the position of which can be seen in FIG. 1 and in particular in FIG. 4. This construction has long been known.

In an embodiment adapted to a particular type of aircraft, a pair of such latches with locking hooks 20, 20' is fixed in a frame 10 as shown in FIGS. 2 and 3. This construction, in which the frame 10 is very wide, ensures that, in contrast to the narrow latch described in DE 42 24 820 C1 cited above, when a container strikes an upright locking hook 20 from the side, in the direction of the axle 22, no excessive bending or tilting moment acts on the attachment region in the floor structure.

Figure 5:
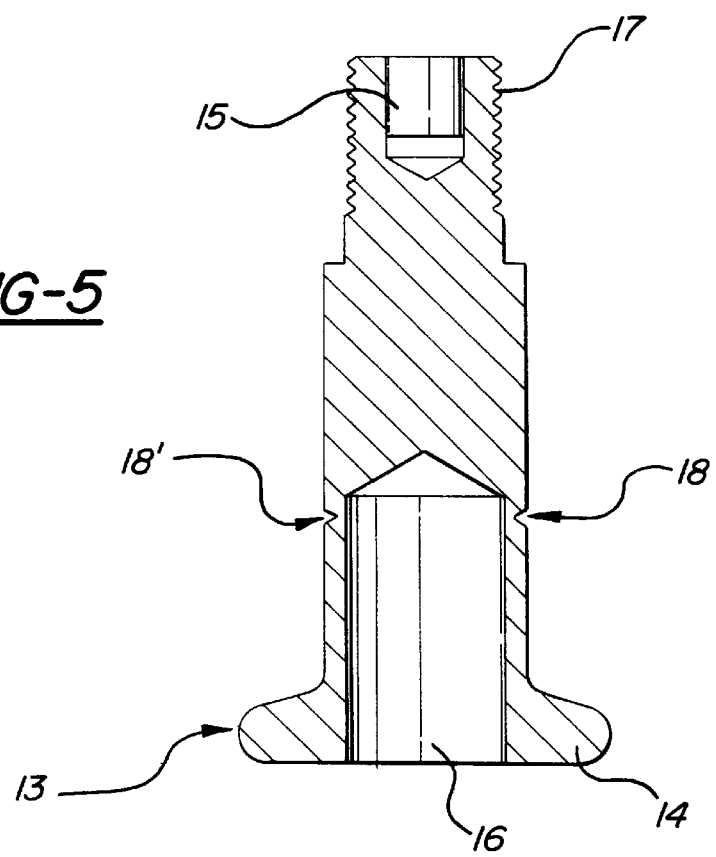
FIG. 5 is an enlarged sectional view of an attachment bolt of the latch similar to that shown in FIG. 4.

The attachment of the latch can be seen in greater detail in FIGS. 4 and 5.

The sectional drawing of FIG. 4 shows in particular, and in addition to the structures described above, the attachment mechanisms with which the latch is attached within the holding structures on the floor of the cargo area.

These attachment mechanisms comprise a front bearing plate 11 and a back bearing plate 12, which are adapted to the particular floor rails of a certain type of aircraft. In the case of other aircraft types, of course, other (or no) bearing plates are provided.

The attachment mechanisms further comprise the attachment bolts 13, each comprising a lower locking head 14, as shown in FIG. 5, and an upper screw thread 17 onto which nuts 19, 19' and 19" can be screwed. The nuts 19 press against catch means 9, 9' and 9" when the attachment bolts 13 are tightened, which can be accomplished by turning a hexagon wrench inserted into a hexagon socket 15.

The attachment bolts 13, 13' and 13" is so constructed that they break in a particular region under a specified load. This predetermined breaking point is defined by a notch 18, which in the embodiment shown here lies in the region of the boundary between the frame 10 and the bearing plates 11, 12. The force at which breaking occurs is specified by the diameter of an internal bore 16 and the depth of the notch 18, which together determine the wall thickness in the region of the breaking point.

The notch 18, in the reference embodiment, runs circumferentially in the outer surface of the attachment bolts 13, 13' and 13". However, in the embodiment shown there two notches 18 and 18' are provided, disposed opposite one another and oriented parallel to the plane of the drawing, so that these safety devices open, i.e. the bolts break at the predetermined breaking points, which are perpendicular to the axle 22, most readily when a force acts on the locking hook 20 perpendicular to the plane of the drawing in FIG. 4, i.e. parallel to the axle 22 and perpendicular to the direction of rotation of the locking hook 20 about the axle 22. When the force acts in another direction, the effective weakening of the bolt 13, 13' and 13" is considerably less, because the maximally loaded places in the bolt are not notched.

At this juncture it should be mentioned explicitly that instead of predetermined breaking points other, preferably reversible opening mechanisms can be provided, which cause the latch element to be released from the holding structure when a container strikes against the locking hook 20 in a direction parallel to the axle 22 of the latch element.

What is claimed is:

1. A latch for securing a container on the floor of a cargo area of an aircraft comprising:

a horizontal axle (22);

a frame (10) supporting said axle (22) in a horizontal plane;

at least one latch hook (20) mounted on said axle (22) for rotation in a vertical plane from a retracted resting position into an upright operating position;

an attachment means (13) for attaching the frame (10) within rails in the floor of the cargo area; and a safety device (18, 18') for completely releasing said latch hook (20) from the rails in the floor in response to a predetermined overload in a horizontal direction parallel to the floor of the cargo area.

2. A latch as claimed in claim 1, wherein said safety device releases said attachment means from the rails in the floor.

3. A latch as claimed in claim 1, wherein the safety device breaks into pieces in response to said predetermined overload.

4. A latch as claimed in claim 3,wherein the attachment means comprises at least one attachment bolt for interconnecting said frame and the rails, said bolt having an internal axial bore and said safety device includes at least one notch disposed in the exterior surface of said bolt and opposite said axial bore for providing a breaking point in response to said predetermined overload.

* * * * *